UNITED STATES PATENT OFFICE.

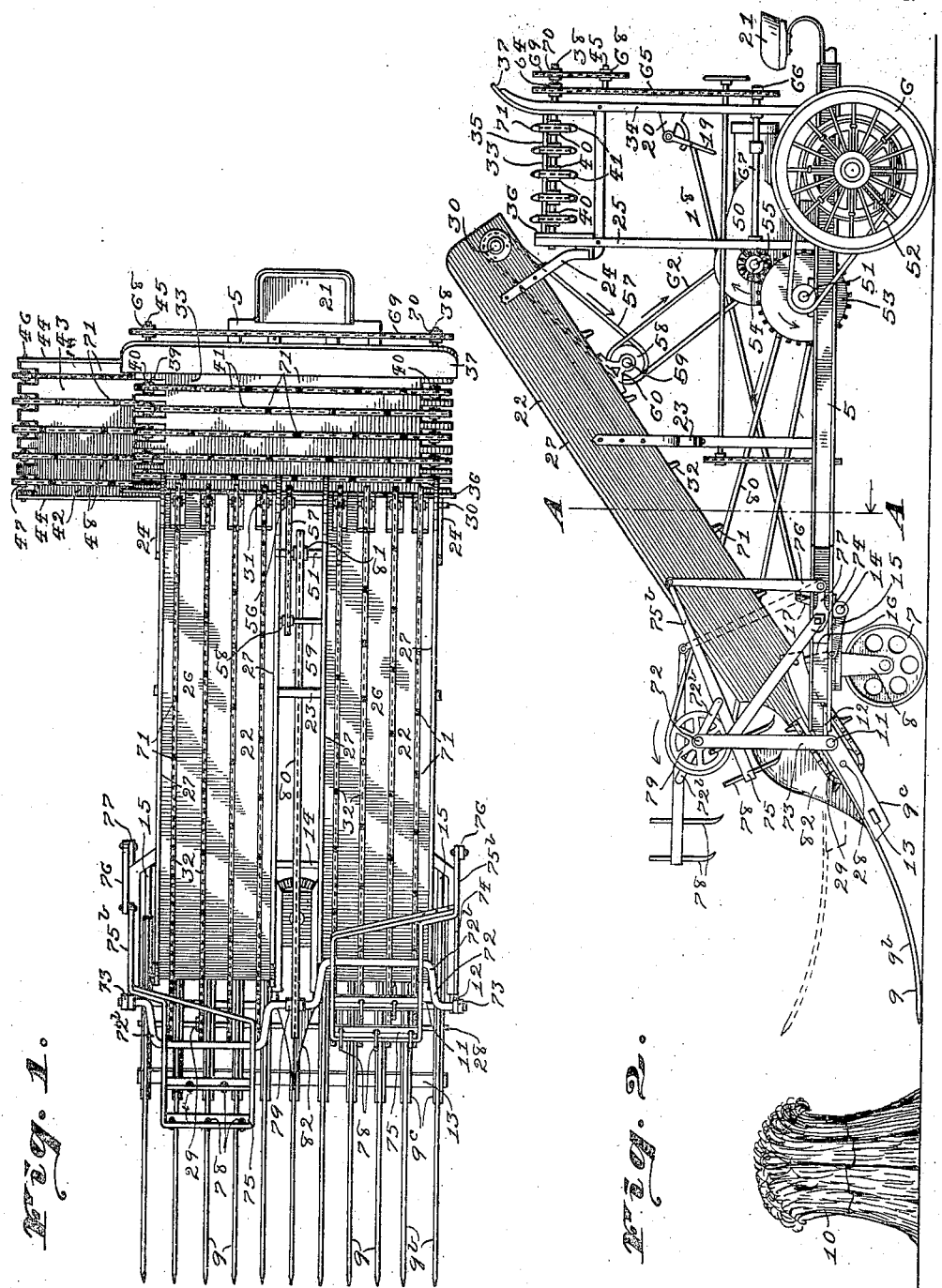

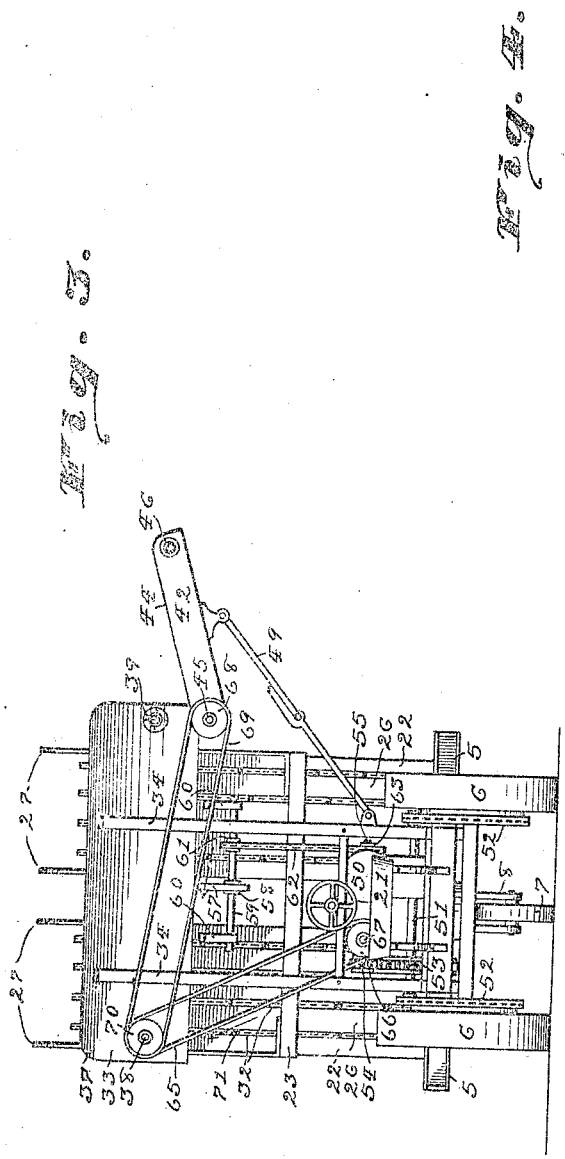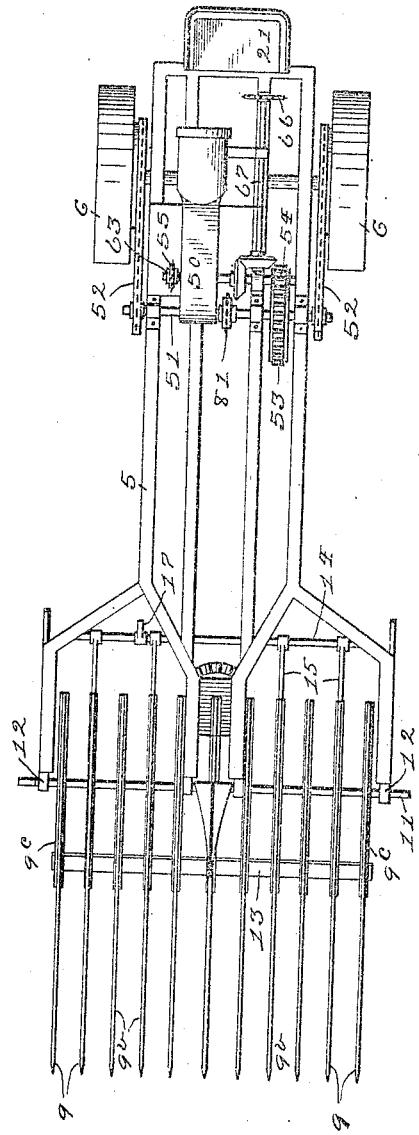

JOHN JAMES, OF WHEATLAND, OKLAHOMA.

GRAIN-SHOCK ELEVATOR.

1,124,453.

Specification of Letters Patent.

Patented Jan. 12, 1915.

Application filed March 5, 1913. Serial No. 752,029.

*To all whom it may concern:*

Be it known that I, JOHN JAMES, a citizen of the United States, residing at Wheatland, in the county of Oklahoma and State of Oklahoma, have invented certain new and useful Improvements in Grain-Shock Elevators, of which the following is a specification, reference being had to the drawings hereto annexed.

Machines of this class commonly consist of a supporting vehicle with teeth or other suitable gathering extremities projecting forward from it in position to slide under a shock of grain as the machine travels forward, means being also included in the machine for elevating the grain from the teeth or other gathering means onto a wagon or other transporting vehicle. A machine having a traveling frame-work supported by ground wheels and having forwardly-extending gathering-teeth adapted to slide along the ground under a shock of grain is shown in Letters Patent No. 915,183, issued to me on the 16 day of March, 1909. This machine also includes a slatted elevator which extends upward and rearward from the rear ends of the gathering-teeth, and in addition to this elevator one or more toothed rakes, carried at their ends by endless chain belts, are provided to insure movement of the grain from the gathering-teeth up said elevator. A disadvantage found in a machine of this class is that the shock of grain, in its intact body, frequently chokes and strains the raking and elevating mechanism, and when delivered by the latter to the wagon it is in too great bulk to be handled by the person attending the loading.

An object, therefore, of the invention is to overcome this difficulty, and in so doing improved means are provided for disintegrating the shock during the time it is being acted upon by the machine.

Other objects and advantages of the invention will be set forth in the ensuing description.

Referring to the drawings, which show an embodiment of the invention in practical form:—Figure 1 is a plan view of the machine, the left-hand end of the figure being the front. Fig. 2 is a left-hand side elevation. Fig. 3 is a rear elevation, with many of the parts omitted in front of the line A—A of Fig. 2. Fig. 4 is a plan view of the machine, with much of the upper structure removed.

Referring to the several figures, in all of which like characters of reference designate like parts, the machine shown in this instance includes a supporting frame 5 which lies in a horizontal plane, the rear end of this frame being carried by ground wheels 6 on each side, while the front end is supported by a single wheel 7 whose straddling fork 8 has fifth-wheel connection with said frame to allow the machine to be guided.

A series of curved gathering teeth 9 project forward from the front of the frame 5, in position to slide along the ground under a shock 10 of grain, a transverse shaft 11 being common to and extended through the rear portions of all said teeth and supported by lugs 12 secured to the front end of said frame. Each tooth 9 in this instance consists of a rod-iron main portion $9^b$, stocked at its rear end by a wooden body $9^c$ to receive the pivot-shaft 11, a wooden bar 13 being common to and extended through the front ends of said wooden members $9^c$ to aline said teeth and insure their concerted movement.

In order to raise the gathering teeth 9 from the ground out of gathering position, a shaft 14 is journaled transversely in the front end of the frame 5, and is provided with forwardly-projecting arms 15, these arms being connected to said teeth 9 rearwardly of their pivot-shaft 11 by links 16. This shaft 14 is also provided with an arm 17 which is connected by a rod 18 to a lever 19, this lever being provided with a suitable locking-quadrant 20 and being within easy reach of an operator in the seat 21 for raising and lowering the teeth 9.

In further arrangement, an elevator, which includes two separated chutes 22, extends upward and rearward from near the pivotal point of the teeth 9 at the front end of the frame 5, the central portions of these chutes being supported by a light frame 23 resting upon the frame 5 while their upper rear ends are supported by strap-metal arms 24 which connect to columns 25 on the rear of said frame 5. Each chute 22 comprises a bottom 26 and side-boards 27, the side-boards projecting about equally above and below said bottom in this instance.

A shaft 28, carrying sprocket pulleys 29, is common to and passes transversely through the wooden portions 9ᶜ of the teeth 9 in front of the pivot-shaft 11, while a similar shaft 30, carrying sprocket pulleys 31, is journaled across the upper rear ends of the chutes 22.

In completing the chutes 22 into an elevator, a series of link belts 32 are arranged to travel upon the pulleys 29 and 31 of the shafts 28 and 30, and the ascending portions of said belts travel upon the upper surfaces of the chute bottoms 26.

A transverse conveyer chute 33 is arranged horizontally under the upper or delivery end of the elevator chutes 22, and supported from the main frame 5 by columns 34 and the columns 25, this chute comprising a bottom 35 and side-boards 36 and 37. Through the receiving end of this chute 33, a shaft 38 is journaled fore-and-aft of the machine, and a similar shaft 39 is likewise journaled through the opposite or delivery end of said chute, each of these shafts carrying sprocket pulleys 40 with endless link belts 41 traveling upon them.

A lateral elevator chute 42, having a bottom 43 with side-boards 44, is pivoted to the right-hand columns 25 and 34, just below the delivery end of the conveyer chute 33, this chute 42 having a shaft 45 journaled through it coincident with its point of pivot, and a similar shaft 46 journaled through its free or delivery end. These shafts 45 and 46 are provided with sprocket pulleys 47, with endless link belts 48 arranged to travel upon them.

The elevator chute 42 is held up in the delivery position shown in Figs. 1 and 3 by jointed braces 49 which are pivoted to its outer end, the lower ends of these braces being pivoted to lower portions of the right-hand columns 25 and 34.

Being an automobile structure, the machine is provided with an engine 50 to propel it, this engine being mounted on the rear of the frame 5. The usual shaft 51 is journaled across the frame 5, and is operatively connected with the ground wheels 6 by link belts 52. This shaft 51 is provided with a gear-wheel 53 which receives motion from a pinion 54 on the crank-shaft 55 of the engine in the usual way.

The link belts 32 of the chutes 22 are driven by their upper shaft 30; and in driving this shaft a sprocket pulley 56 on it receives motion through a link belt 57 from a similar pulley 58 on a counter-shaft 59 journaled in bearings 60 depending from the side-boards 27 of the chutes 22. This counter-shaft 59, in turn, has a sprocket pulley 61 which receives motion through a link belt 62 from a similar pulley 63 on the crankshaft 55 of the engine. The link belts 41 of the transverse conveyer chute 33 are driven by the shaft 38 of said chute; and in driving this shaft a sprocket pulley 64 on it receives motion through a link belt 65 from a similar pulley 66 on the shaft 67 which commonly extends rearward and revolves as a necessary member in an engine of the class used for this purpose. The link belts 48 of the elevator chute 42 are driven by the shaft 45 of said chute; and in driving this shaft a sprocket pulley 68 on it receives motion through a link belt 69 from a similar pulley 70 on the shaft 38 aforesaid. All the link belts of the chutes are provided at intervals with spikes or fingers 71 to engage the grain; and when the teeth 9 slide under a shock 10 of grain the bundles or parts of said shock are caught by said belts and carried up the chutes 22 into the conveyer chute 33, along in said chute 33 into the chute 42, and up said chute 42 to fall into a receptacle which may be driven alongside the machine.

In arranging the disintegrating mechanism of the machine, a shaft 72, having two cranks 72ᵇ formed therein, is journaled transversely over the pivotal portions of the teeth 9, in standards 73, these standards being supported by the pivot-shaft 11 of said teeth 9 and being held rigid by brace connections 74 with the frame 5. Each crank 72ᵇ of the shaft 72 extends through and carries a raking-frame 75, a rearward extension 75ᵇ of which pivotally attaches to the upper end of a radius-bar 76 whose lower end is pivoted to a lug 77 on the frame 5. With these raking-frames 75 thus carried by the crank-shaft 72 and radius-bars 76, their forward portions and the raking-teeth 78 carried thereby will be given a raking movement that will tear the shock 10 apart and forcibly draw it from the gathering teeth 9 up into engagement with the belts 32.

To drive the crank-shaft 72, a sprocket wheel 79 is mounted upon it centrally of the width of the machine, and motion is imparted to this wheel 79 through a link belt 80 from a sprocket wheel 81 on the shaft 51 aforesaid. To clear this belt 80, and to afford the operator a view forward in driving the machine, the two chutes 22 are spaced a considerable distance apart, as best shown in Fig. 1.

In further aiding the disintegration process, a dividing stop 82 is mounted over the central one of the gathering teeth 9 at a point approximately under the crank-shaft 72 or about where the shock is attacked by the raking-teeth 78 and the elevator belts 32. This stop 82 is supported by having its pointed front end secured to the center tooth 9 and its lower rear corners to the pivot-shaft 11, so that, incidentally, it follows the movements of the teeth 9 as the latter are raised or lowered.

In driving the machine, the operator centers the stop 82 into the shock 10, each raking-frame 75 striking down into the shock in alternation with its mate to tear away its portion of said shock and rake it up onto its respective chute 22. The dividing action of the stop 82 retards movement of the shock 10 from the gathering teeth 9 onto the chutes 22 and thereby holds the shock under the action of the raking-frames 75, with the result that the grain is delivered by the machine to the transporting vehicle in a disintegrated condition and a more even supply for loading.

Having thus described the invention, I claim:—

1. A self propelled vehicle of the class described, comprising in combination, a frame, propelling means carried by said frame, chutes mounted on said frame, endless conveyers disposed in said chutes having spurs disposed in spaced relation thereon, a series of radially movable collecting fingers carried by said frame and disposed at one end of said chutes, said fingers being adapted to deliver thereto, a second conveyer mounted transverse to said first mentioned conveyer and adapted to be fed therefrom, a dividing stop disposed between said first mentioned chutes and carried by one of said fingers.

2. A self propelled vehicle of the class described, comprising in combination, a frame propelling means carried by said frame, chutes mounted on said frame, endless conveyers disposed in said chutes having spurs disposed in spaced relation thereon, a series of radially movable collecting fingers carried by said frame and disposed at one end of said chutes, said fingers being adapted to deliver thereto, a second conveyer mounted transverse to said first mentioned conveyer and adapted to be fed therefrom, a dividing stop disposed between said first mentioned chutes and carried by one of said fingers, a crank shaft mounted transverse of said chutes and having a plurality of cranks, raking implements carried by the thin portions of said cranks, and means for rotating the crank shaft.

Witness my hand this 15 day of February, 1913.

JOHN JAMES.

Witnesses:
  PAT RODEW,
  GEO. L. COLE.